March 10, 1936.  A. BARÉNYI  2,033,506
PHOTOGRAPHIC CAMERA
Filed Oct. 8, 1935　2 Sheets-Sheet 1

INVENTOR
Árpád Barényi
By Frank Reichold
ATTORNEY

March 10, 1936.                    A. BARÉNYI                      2,033,506
                               PHOTOGRAPHIC CAMERA
                               Filed Oct. 8, 1935              2 Sheets-Sheet 2

INVENTOR
Árpád Barényi
By Frank T Reichord
ATTORNEY

Patented Mar. 10, 1936

2,033,506

UNITED STATES PATENT OFFICE 2,033,506

PHOTOGRAPHIC CAMERA

Árpád Barényi, Berlin-Steglitz, Germany, assignor to Voigtländer & Sohn Aktiengesellschaft, Brunswick, Germany, a joint-stock company of Germany Application October 8, 1935, Serial No. 44,007
In Germany October 9, 1934

5 Claims. (Cl. 95—45)

My invention relates to improvements in photographic cameras, and more particularly in cameras of the self-erecting type. One of the objects of the improvements is to provide a camera, in which the mechanism controlling the movement of the lens front for focusing and erecting the same may be set into focusing position corresponding to the distance of the subject to be photographed, while the camera is closed, and with this object in view my invention consists in providing a member within the body of the camera near the hinge of the base board, which is shiftable substantially in the direction of the line of sight, and which is connected by links respectively with the usual struts or levers carrying the lens front and the slide on which the said levers or struts are pivotally mounted, the lengths of the said links being such that in any focusing position of the said slide the said member is located within said body so as to permit the camera to be closed.

Other objects of the improvements will appear from the following description.

Figure 1:
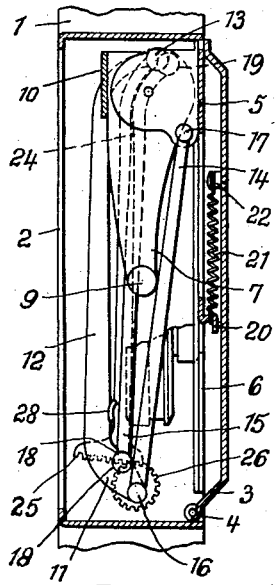
Figure 3:
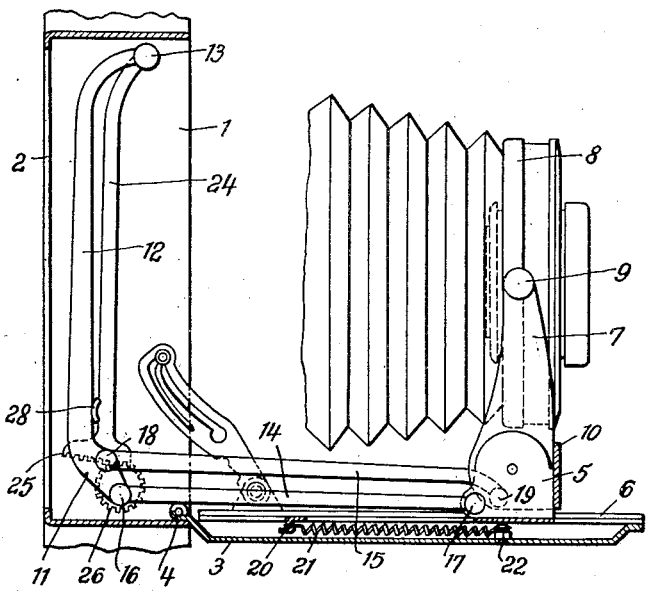
Figure 2:
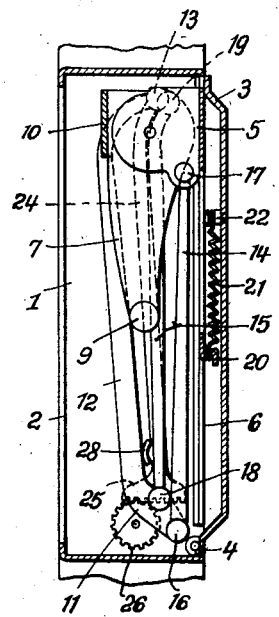
Figure 4:
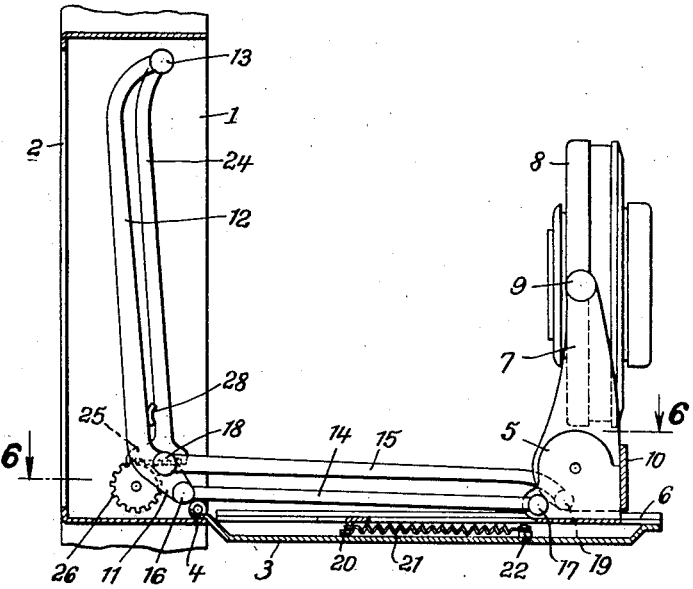
Figure 5:
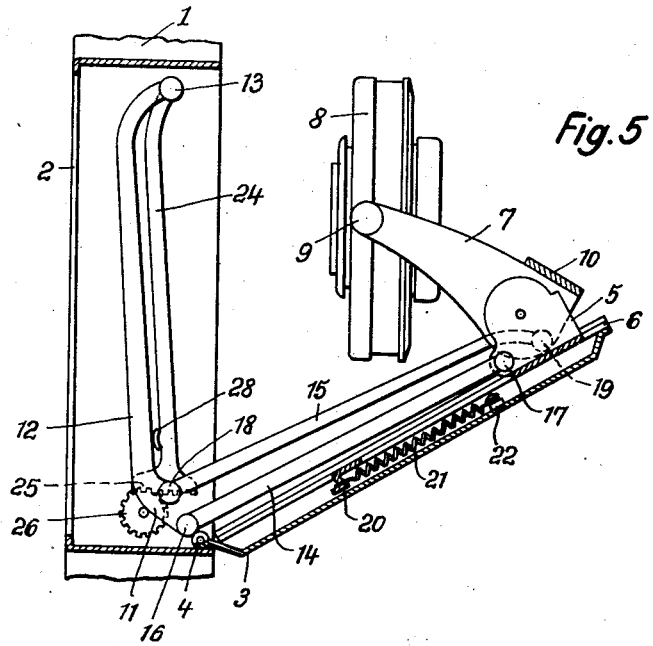
Figure 6:
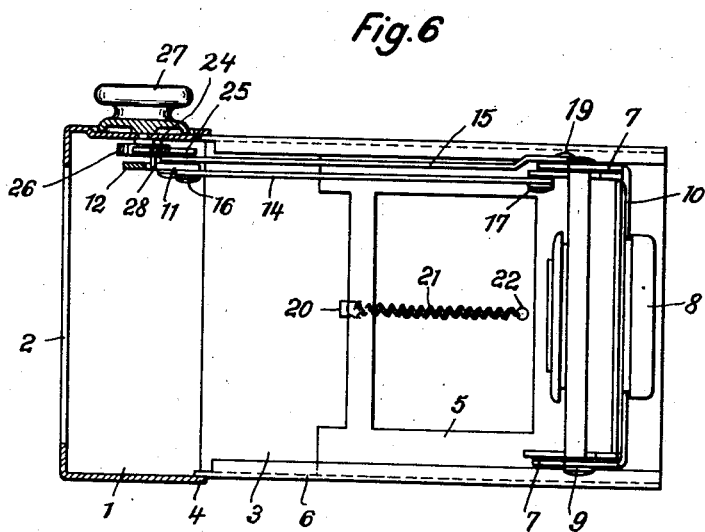

For the purpose of explaining the invention an example embodying the same has been shown in the accompanying drawings in which the same reference characters have been used in all the views to indicate corresponding parts. In said drawings, Fig. 1 is a fragmentary sectional elevation showing a part of the camera and the focusing and erecting mechanism, the camera being closed, and the focusing and erecting mechanism being in the position corresponding to relatively remote subjects, and the lens board and lens being partly broken away, Fig. 2 is a similar sectional elevation showing the focusing and erecting mechanism in the position corresponding to the taking of a photograph of a subject located near the camera, the lens board and lens being omitted, Figs. 3 and 4 are sectional elevations respectively of Figs. 1 and 2 taken along the optical axis of the camera, Fig. 5 is a sectional elevation similar to the one illustrated in Figs. 3 and 4 and showing the camera partly closed, and Fig. 6 is a sectional plan view taken on the line 6—6 of Fig. 4.

In the construction shown in the drawings the camera comprises a body 1 having an exposure opening 2, a base board 3 hinged to the camera at 4, a slide 5 guided longitudinally of the base board in tracks 6, and a pair of levers or struts 7 pivotally mounted on the slide 5 and having the lens front 8 pivotally mounted thereon at 9. Preferably the levers or struts 7 are connected with each other by a transverse plate 10 adapted to bear on the slide 5 when the lens front is in erected position. In addition bellows and means are provided for locking the slide 5 and the struts or levers 7 in position, which parts are known in the art and do not form a part of the present invention, and which have been omitted from the drawings for more clearly showing the novel parts of the camera. Within the camera a member 11 is located near the hinge 4 which is movable substantially in the direction of the line of sight. As shown the said member is made integral with an arm 12 which is pivotally mounted at 13 on one of the side walls of the body of the camera near the top thereof. The said member is connected by a link 14 to the slide 5, the said link being jointed to the member and slide respectively at 16 and 17. Further, the member 11 is connected by a link 15 with a downwardly directed part of one of the struts or levers 7, the link being jointed to the said parts respectively at 18 and 19. The distance between the hinge 4 and the joint 18 is larger than the distance between the said hinge and the joint 16, and the lengths of the links 14 and 15 are such that in any position of the slide 5 the member 11 is located within the body 1.

The slide 5 is adapted to be shifted for focusing in the direction of the line of sight, and for this purpose the following mechanism is provided. To a lug 20 projecting downwardly from the slide 5 a coiled spring 21 is attached which is attached with its opposite end to a pin 22 fixed to the base board 3, the said spring tending to shift the slide 5 and the lens front carried thereby outwardly and into position for taking a photograph of a relatively near subject which may be located for example at a distance of 1 meter. On the pivot bolt 13 of the arm or lever 12 an arm 24 is mounted which is made integral with a toothed segment 25 engaged by a pinion 26 mounted in one of the side walls of the body 1 and adapted to be rotated by means of a button 27 located at the outside of the body. The arm 24 is made integral with a lug 28 which is adapted to engage the arm or lever 12 and to shift the same rearwardly and in opposition to the spring 21.

The operation of the focusing and erecting mechanism of the camera is as follows:

In Fig. 3 the camera has been shown open, and the slide 5 and the lens front 8 carried thereby are in position for taking a photograph from a relatively remote subject, the said slide and lens front being in the position nearest to the body 1 and the exposure opening thereof. In Fig. 4 the slide 5 and the lens front are in the position for taking a photograph from a subject located near the camera, say at a distance of one meter, it being understood that this is the smallest distance between the camera and the subject. As is shown in Figs. 3 and 4 the member 11 is located entirely within the camera in both end positions of the lens board.

If now the camera is closed the links 14 and 15 turn about their pivots 16 and 18, while the base board turns about the hinge 4. Thereby the slide 5 is shifted outwardly on its tracks, and the pivot 19 of the link 15 is likewise shifted outwardly. However, by reason of the larger distance between the hinge 4 and the pivot 18 as compared to the distance between the hinge 4 and the pivot 16 the pivot 19 is shifted outwardly in a greater degree than the pivot 17, and therefore there is relative displacement between the said pivots 17 and 19, the pivot 19 moving outwardly relatively to the pivot 17. Therefore, the struts or levers 7 are inclined on the slide 5, as is shown in Fig. 5, and finally, that is when the camera is closed, the struts or levers 7 are directed downwardly, as is shown in Figs. 1 and 2. In a similar way the camera is closed from the position shown in Fig. 4.

The member 11 may be set for focusing while the camera is closed, and for this purpose the button 27 and the pinion 21 are turned in a direction for moving the arm 24 inwardly or outwardly, and according as the said arm or lever 24 is moved the lever 12 and the member 11 are moved inwardly or outwardly. When the camera is opened the spring 21 shifts the slide 5 outwardly until the lever 12 engages the lug 28 of the arm 24.

In this operation it is important that the pivot bolts 16 and 18 be guided in the correct paths, and the path of the pivot bolt 11 must be concentric of the pivot bolt 13 or nearly so. If the path of the pivot bolt were not concentric, for example if it were horizontal, a pull would be exerted on the erecting link 15 when the member 11 is shifted rearwardly and from the position shown in Fig. 2 into the position shown in Fig. 1, and thereby the levers or struts 7 would be turned rearwardly and into a position in which there is no room for accommodating the lens front, most of the rear part of the camera body being occupied by the film guides and the folded bellows. It is not necessary that in the closed camera the pivots 13 and 19 be exactly concentric, because a slight displacement of the levers or struts 7 is not objectionable, and because, further, a certain inaccuracy caused by the movement of the link 15 is compensated by a similar displacement of the link 14. In the construction shown in the figures, and more particularly in Figs. 1 and 2, the pivot 19 is slightly eccentric to the pivot 13, and therefore when the parts are shifted from the position shown in Fig. 2 into the position shown in Fig. 1 the pivot 11 is slightly pulled downwardly, and accordingly the struts or levers 7 are slightly turned rearwardly and clockwise. However, by the same operation also a pull is exerted on the link 14 and thereby a slight downward movement is imparted to the slide 5 which carries the struts 7. Therefore, there is substantially no movement of the pivot bolt 19 relatively to the slide 5, and therefore the struts 7 are not turned rearwardly. This result is attained, because by the displacement of the member 11 the pivot bolt 19 and the slide are simultaneously moved in the same direction, the pivot bolts 19 and 17 being located on the same side of the pivot bolt 13. I wish it to be understood that the slide 5 and the member 11 may also be set for focusing by means of the button 27 when the camera is open.

I claim:

1. A folding camera, comprising a body, a base board hinged thereto, a lens front connected to the body by bellows, a slide longitudinally shiftable on said base board, a lever pivotally mounted on said slide and having said lens front jointed thereto, a member within said body having a portion movable therein near the hinge of said base board substantially in the direction of the optical axis of the camera, a shifting or focusing link jointed respectively to said slide and said member near said hinge, and an erecting link jointed respectively to said lever and to said member, the distance between the joint of said erecting link and said hinge being greater than the distance between the joint of said shifting or focusing link and the said hinge, and the lengths of said links being such that with the slide and lens set to any focusing position corresponding to the distances of the subject to be photographed the said member is located within said body.

2. A folding camera as claimed in claim 1, in which guiding means are provided for said member which are constructed so that with the camera closed the distance between the said member and the joint of the said lever and the erecting link attached thereto is substantially alike in any position of the said member.

3. A folding camera as claimed in claim 1, in which the member comprises a lever jointed to said body at a part near the position assumed by the joint of said lever and the erecting link attached thereto when the camera is closed.

4. A folding camera as claimed in claim 1, comprising in addition means operated from the outside of said body for setting said member in position corresponding to the distance of the subject to be photographed.

5. A folding camera as claimed in claim 1, in which the member comprises a lever jointed to said body at a part near the position assumed by the joint of said lever and the erecting link attached thereto when the camera is closed, the said joint and the joint of the shifting or focusing link and the slide being located at the same side of the pivot of the member on the body.

ÁRPÁD BARÉNYI.